Figure 1:
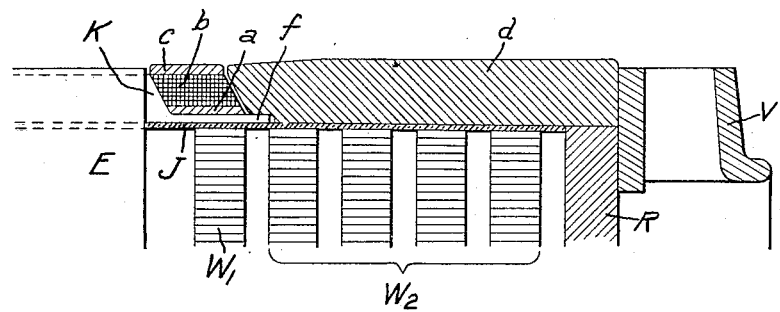

July 21, 1931.  R. POHL  1,815,795
TURBO GENERATOR
Filed Aug. 22, 1929

Inventor:
Robert Pohl,
by Charles E. Tullar
His Attorney.

Patented July 21, 1931

1,815,795

UNITED STATES PATENT OFFICE

ROBERT POHL, OF BERLIN-CHARLOTTENBURG, GERMANY, ASSIGNOR TO GENERAL ELECTRIC COMPANY, A CORPORATION OF NEW YORK

TURBO-GENERATOR

Application filed August 22, 1929, Serial No. 387,736, and in Germany August 29, 1928.

My invention relates to rotors for dynamo-electric machines and more particularly to the winding-supporting heads of the rotors of turbo-generators.

In order to protect such heads against centrifugal action, it has been proposed to provide bindings or caps on them. Bindings have the advantage of permitting high stress, while caps or supporting rings have the advantage of being readily removable for inspecting the heads. It has also been proposed to combine bindings and caps by arranging them in concentric relation, and particularly, by reinforcing caps by bindings.

In rotors having inserted teeth and caps for holding the winding-supporting heads as described, the last teeth at the ends of the rotor were provided with recesses as seats for the end of the cap and the cap was centered by such recesses, and shrunk to them. This system involves the drawback that these teeth and the part of the winding which are held by them, put an additional load on the edges of the cap and that the damping cage was imperfect as the electrical connection of the ends of the slot-wedges was not reliable.

It is an object of my invention to remove these drawbacks while conserving the accessibility of the heads.

To this end I provide a binding and a cap in axial juxtaposition.

My invention is particularly suitable for rotors having inserted teeth but I am not limited to this particular application. In carrying out my invention I wind a binding of a good conductor about the ends of the slot-wedges so as to combine the wedges electrically into a damping cage. About this conducting binding I place a binding for reinforcing it, which may be of high-class non-magnetic steel wire. By means of this reinforcing binding the ends of the wedges and the end connections in the head which are below the wedges and nearest to the active iron, are held down firmly and secured to a sufficient extent against centrifugal action. At the side of the binding I provide a removable cap or supporting ring which surrounds the other end connections. In this manner the edges of the supporting ring are not loaded by the last teeth and parts of windings, and a squirrel cage damper is provided separate from the supporting ring. My novel arrangement conserves the advantage of ready accessibility of the head by removing the cap, and it also conserves the excellent properties of the binding, to wit, good electric connection of wedge ends, and good mechanical securing of the heads at the point of maximum stress.

It will be understood that the binding according to my invention must stand considerable mechanical stress while at the same time affording a good conducting connection of the wedge ends. Therefore, as mentioned, it is preferable to build it up from two bindings in accordance with known rules of the art, the lower or inner winding being of a good conductor, such as copper, and the other being of a material which is adapted to stand high stress, such as nonmagnetic steel wire.

For protecting the outer surface of the binding against damage, for instance, by arcing, a shell of solid material may be placed on the binding unit. The size required for the shell is only such that it will stand centrifugal action from its own weight.

Centering of the supporting ring is generally required at its outer end only, and it may be centered on the end ring of the rotor. However, it is also possible to utilize the ends of the wedges as centric seats for the edge of the supporting ring which extends toward the active iron, as the ends of the wedges are firmly held on their support. This is effected by extending the ends of the wedges beyond the binding, and turning down the ends after securing the binding so that a cylindrical seat is provided for the edge of the supporting ring.

In the drawings affixed to this specification and forming part thereof three systems embodying my invention are illustrated diagrammatically by way of example.

In the drawings

Figure 2:
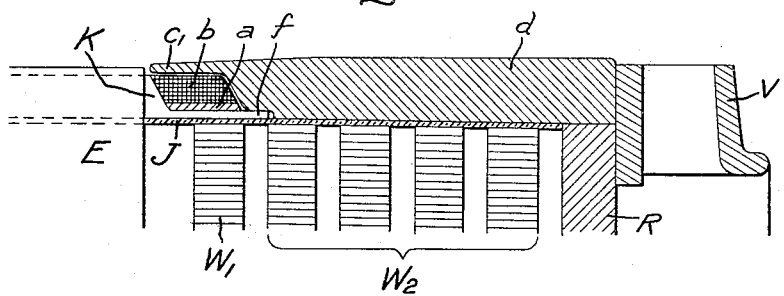
Figure 3:
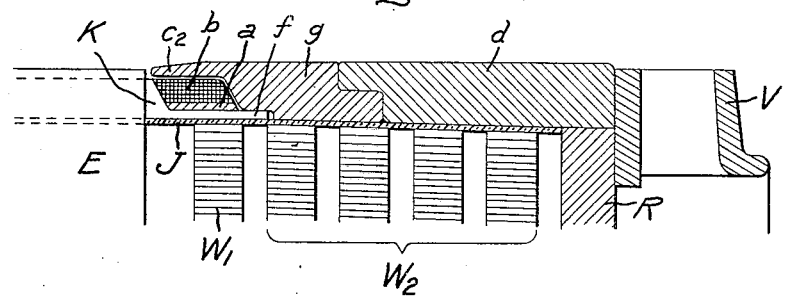

Fig. 1 is a section showing part of a rotor and a supporting ring and binding in juxtaposition, with a separate shell on the binding, Fig. 2 illustrates an arrangement in which the supporting ring is extended to form the shell, and Fig. 3 illustrates an arrangement in which the supporting ring consists partly of a magnetic, and partly of a non-magnetic section.

Referring now to the drawings, in all figures E is the active iron of the rotor, K is one of the slot-wedges, R is the end ring, V is the fan at the end of the rotor, and J is an insulating layer. The winding heads are secured by the combined action of a binding and a supporting ring, the winding heads $W_1$ which are nearest the active iron E being held by the binding, and the other winding heads $W_2$ being held by the supporting ring $d$.

The binding is secured on the reduced ends of the wedges K and built up from a good conductor $a$ which may be copper, and serves as a good conducting connection of the wedges all over their perimeter, and a reinforcing binding band $b$ on the outside of the conductor $a$ which may be of high-class non-magnetic steel wire, as mentioned. This reinforcing binding $b$ not only exerts on the conductor $a$ the pressure required for making good contact, but also holds down the ends of the wedges K so that the ends and the winding heads $W_1$ are effectively secured against centrifugal action.

$d$ is the supporting ring which is at one end shrunk to the end ring R, and at the other end is supported and centered on extensions $f$ of the wedge ends. The ring $d$ extends only across the winding heads $W_2$, but all winding heads are accessible when the ring is removed.

Referring now to Fig. 1, $c$ is a separate shell which is placed about the reinforcing binding $b$ and, as mentioned, serves only for protecting it against damage.

Referring now to Fig. 2, the shell $c$ is here replaced by an extension $c_1$ of the ring $d$. The extension, however, is not shrunk on the binding $b$ and is subjected to stress only by centrifugal action under the influence of its own weight.

The supporting ring $d$ can be made throughout of magnetic or non-magnetic material. Referring to Fig. 3, the ring is divided into a magnetic section $d$ and a section $g$ of non-magnetic material, for instance, non-magnetizable steel, bronze or the like. This non-magnetic section $g$ is extended at $c_2$, which extension corresponds to the extension $c_1$ in Fig. 2.

As mentioned, I am not limited to rotors having inserted teeth but my invention may also be applied to rotors having solid teeth, and in general I wish it to be understood that I do not desire to be limited to the exact details of construction shown and described for obvious modifications will occur to a person skilled in the art.

I intend in the appended claims to cover all modifications of my invention which do not depart from the spirit and scope thereof.

I claim:—

1. A rotor for dynamo-electric machines including a slotted core structure having windings thereon, wedges in the slots for retaining said windings therein, a conductor secured about the ends of said wedges and cooperating therewith to form a squirrel cage winding, reinforcing bands secured about said conductor for retaining the same in place, and a supporting ring arranged about the end turns of said winding.

2. A rotor for dynamo-electric machines including a slotted core structure having windings thereon, wedges in the slots for retaining said winding therein, a conductor secured about the ends of said wedges and cooperating therewith to form a squirrel cage winding, reinforcing bands secured about said conductor for retaining the same in place, and a supporting ring arranged about the end turns of said winding, said supporting ring extending about the ends of said wedges.

3. A rotor for dynamo-electric machines including a slotted core structure having windings thereon, wedges in said slots for retaining said windings in the slots and extending beyond the ends of the slots, said wedges having the ends thereof reduced in thickness, a conductor secured to the reduced ends of said wedges and cooperating therewith to form a damper winding, a reinforcing band secured about said conductor for retaining the same in place, and a supporting ring arranged about the end turns of said winding.

4. A rotor for dynamo-electric machines including a slotted core structure having windings thereon, wedges in said slots for retaining said windings in the slots and extending beyond the ends of the slots, said wedges having the ends thereof reduced in thickness, a conductor secured to the reduced ends of said wedges and cooperating therewith to form a damper winding, a reinforcing band secured about said conductor for retaining the same in place, and a supporting ring arranged about the end turns of said winding, said supporting ring tightly fitting the reduced ends of said wedges and surrounding said band.

5. A rotor for dynamo-electric machines including a slotted core structure having windings thereon, wedges in the slots for retaining said windings therein, the ends of said wedges being reduced in thickness and extending beyond the ends of the slots, a conductor secured about the reduced ends of said wedges and cooperating therewith to form a squirrel cage winding, a multi-layer binding band secured about said conductor for retaining the same in place, and a supporting ring arranged about the end turns of said winding, said supporting ring tightly fitting the reduced ends of said wedges.

In testimony whereof I affix my signature.

ROBERT POHL.